(12) United States Patent
Xue

(10) Patent No.: US 10,565,290 B2
(45) Date of Patent: Feb. 18, 2020

(54) ONLINE DISPLAYING A DOCUMENT

(71) Applicant: International Business Machines Corporation, Armonk, NY (US)

(72) Inventor: Zhi Yong Xue, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/411,416

(22) Filed: May 14, 2019

(65) Prior Publication Data

US 2019/0266222 A1 Aug. 29, 2019

Related U.S. Application Data

(63) Continuation of application No. 14/631,919, filed on Feb. 26, 2015, now Pat. No. 10,394,935.

(30) Foreign Application Priority Data

Feb. 27, 2014 (CN) .......................... 2014 1 0068034

(51) Int. Cl.
*G06F 17/21* (2006.01)
*G06F 9/54* (2006.01)
*G06F 17/22* (2006.01)

(52) U.S. Cl.
CPC .............. *G06F 17/212* (2013.01); *G06F 9/54* (2013.01); *G06F 17/2247* (2013.01)

(58) Field of Classification Search
CPC ................................................... G06F 17/212
See application file for complete search history.

(56) References Cited

U.S. PATENT DOCUMENTS 5,617,115 A 4/1997 Itoh et al.
7,401,289 B2 7/2008 Lachhwani et al.
(Continued)

FOREIGN PATENT DOCUMENTS

CN 101197849 A 6/2008
CN 101860533 A 10/2010
(Continued)

OTHER PUBLICATIONS

IBM: List of IBM Patents or Patent Applications Treated As Related (Appendix P), Sep. 24, 2019, pp. 1-2.
(Continued)

*Primary Examiner* — James J Debrow
(74) *Attorney, Agent, or Firm* — Robert C. Bunker

(57) ABSTRACT

Embodiments of the present disclosure provide a method and apparatus for online displaying a document. In one embodiment of the present disclosure, there is provided a method for online displaying a document, comprising: extracting a plurality of data objects from the document; obtaining sizes of corresponding data objects among the plurality of data objects by constructing a document object model associated with the plurality of data objects; generating a layout repository based on the sizes; and rendering the plurality of data objects based on the layout repository, so as to online display the document. In one embodiment of the present disclosure, there is provided an apparatus for online displaying a document. By means of the method and apparatus of the present disclosure, the efficiency of online displaying documents can be increased and thereby user experience can be improved.

20 Claims, 8 Drawing Sheets

(56) References Cited

U.S. PATENT DOCUMENTS

| | | |
|---|---|---|
| 7,434,159 B1 | 10/2008 | Lin |
| 7,509,404 B2 | 3/2009 | Agrawal et al. |
| 7,624,343 B2 | 11/2009 | Malkin et al. |
| 7,747,941 B2 | 6/2010 | Campbell et al. |
| 8,413,045 B2 | 4/2013 | Lemonik et al. |
| 8,887,044 B1 * | 11/2014 | Goodspeed et al. ...... G06F 3/00 |
| 10,394,935 B2 | 8/2019 | Xue |
| 2005/0216836 A1 | 9/2005 | Duke |
| 2006/0031761 A1 | 2/2006 | Ohta |
| 2006/0168514 A1 | 7/2006 | Tokunaga |
| 2007/0180364 A1 | 8/2007 | Kobayashi |
| 2007/0211293 A1 | 9/2007 | Komamura |
| 2008/0005659 A1 | 1/2008 | Fujimaki |
| 2012/0066586 A1 | 3/2012 | Shemesh |
| 2013/0124953 A1 | 5/2013 | Fan |

FOREIGN PATENT DOCUMENTS

| | | |
|---|---|---|
| KR | 100577084 B1 | 4/2006 |
| WO | 2013082654 A1 | 6/2013 |

OTHER PUBLICATIONS

Chinese Office Action received in Chinese Counterpart Application Serial No. 201410068034.4 dated Aug. 18, 2017, pp. 1-7.

Chinese Search Report received in Chinese Counterpart Application Serial No. 201410068034.4 dated Aug. 18, 2017, pp, 1-2.

Aidan Chopra, "How to Build a LayOut Document:" http://www.dummies.com/how-to/content/how-to-build-a-layout-document.html, downloaded on Dec. 9, 2014, pp. 1-3.

Evan Schrier et al., "Adaptive layout for Dynamically Aggregated Documents," http://dl.acm.org/citation.cfm?id=1378787, downloaded Feb. 25, 2015, pp. 99-108.

* cited by examiner

ONLINE DISPLAYING A DOCUMENT

RELATED APPLICATIONS

The subject application is a continuation application of U.S. patent application Ser. No. 14/631,919, filed on Feb. 26, 2015, which is a claims the benefit of Chinese Patent Application with Serial No. CN 201410068034.4, filed on Feb. 27, 2014, the entire contents of which are herein incorporated by reference.

FIELD

Various embodiments of the present disclosure relate to document displaying, and more specifically, to a method and apparatus for online displaying a document.

BACKGROUND

With the development of computer technology, besides data transmission, more and more powerful functions can be provided via computer networks. For example, cloud computing is a model of service delivery for enabling convenient, on-demand network access to a shared pool of configurable computing resources. At this point, a user does not have to buy a high-performance computing device and install various application programs on the computing device to meet his/her demand, but can obtain needed resources and services via cloud.

For example, the user does not have to install a document editor on a local computer, but rather can view and edit documents using a browser through an online document editor provided by a network service provider. In addition, with the miniaturization and diversity tendency of computing devices, more and more users tend to use portable computing devices (such as tablet PCs, smart phones, personal digital assistants, etc.) for viewing and editing documents. Since hardware configuration of portable computing device is usually low, research has been directed toward providing online document editors for use via portable computing devices.

Though browser-based online document editors have been developed so far, their displaying efficiency tends to be low and they may not be able to display document content at a user-desired speed, and such a long delay during document displaying may lead to bad user experience.

SUMMARY

According to some implementations of the present disclosure, systems and methods for online displaying documents efficiently may be provided, which may be compatible with existing browser-based online text editors so as to achieve high-efficiency online displaying on various computing devices (especially portable computing devices).

In one embodiment of the present disclosure, there is provided a method for online displaying a document, including: extracting a plurality of data objects from the document; obtaining sizes of corresponding data objects among the plurality of data objects by constructing a document object model (DOM) associated with the plurality of data objects; generating a layout repository based on the sizes; and rendering the plurality of data objects based on the layout repository, so as to online display the document.

In one embodiment of the present disclosure, a data object among the plurality of data objects may be uniquely identified based on text content and style associated with the data object.

In one embodiment of the present disclosure, obtaining sizes of corresponding data objects among the plurality of data objects by constructing a document object model associated with the plurality of data objects may include: constructing the document object model based on text content and style associated with the plurality of data objects; and using a browser to render the document object model so as to obtain sizes of corresponding data objects among the plurality of data objects.

According to another implementation, a computer program product may include a non-transitory computer readably storage medium having a plurality of instructions stored on it. When executed by a processor, the instructions may cause the processor to perform operations including extracting a plurality of data objects from a document. Instructions may also be included for obtaining sizes of corresponding data objects among the plurality of data objects by constructing a document object model associated with the plurality of data objects. Instructions may also be included for generating a layout repository based on, at least in part, the sizes. Instructions may further be included for rendering the plurality of data objects based on, at least in part, the layout repository, so as to online display the document.

In one embodiment, a data object among the plurality of data objects may be uniquely identified based on, at least in part, text content and style associated with the data object.

In one embodiment, the instructions for rendering the plurality of data objects based on, at least in part, the layout repository so as to online display the document may include instructions for rendering the plurality of data objects line by line according to page width for online displaying the document and based on, at least in part, the layout repository, so as to online display the document.

In one embodiment, the style may include at least any one of: font, font size, bold, italics, superscript, subscript, heading, and text. In an embodiment, the data object may be a text object.

According to a further implementation, a computing system may include a processor and a memory device coupled with the processor. The processor may be configured for extracting a plurality of data objects from a document. The processor may also be configured for obtaining sizes of corresponding data objects among the plurality of data objects by constructing a document object model associated with the plurality of data objects. The processor may also be configured for generating a layout repository based on, at least in part, the sizes. The processor may further be configured for rendering the plurality of data objects based on, at least in part, the layout repository, so as to online display the document.

In one embodiment, a data object among the plurality of data objects may be uniquely identified based on, at least in part, text content and style associated with the data object.

In one embodiment, the processor configured for rendering the plurality of data objects based on, at least in part, the layout repository so as to online display the document may be further configured for rendering the plurality of data objects line by line according to page width for online displaying the document and based on, at least in part, the layout repository, so as to online display the document.

In one embodiment, the style may include at least any one of: font, font size, bold, italics, superscript, subscript, heading, and text. In one embodiment, the data object may include a text object.

By means of the method and apparatus as described in the present disclosure, the efficiency of online displaying documents may be increased, and user wait time may be reduced and thereby user experience is improved.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
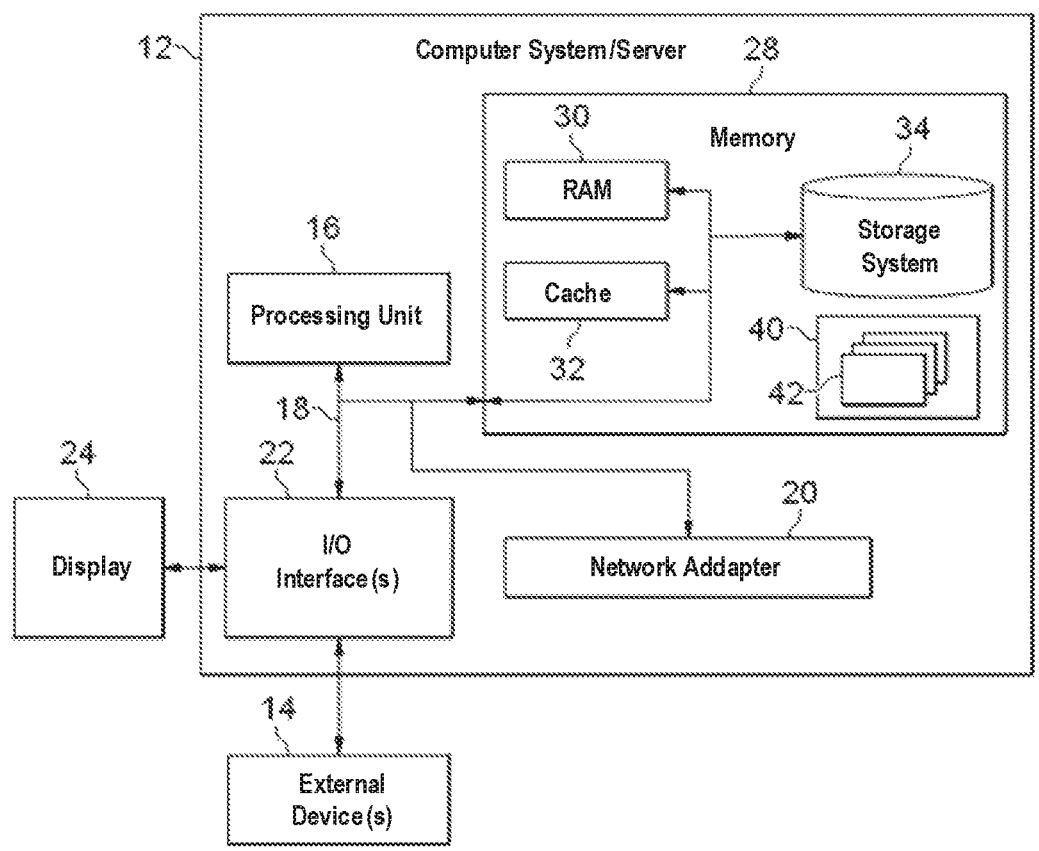
FIG. 1 schematically depicts a block diagram of an exemplary computer system/server which may be utilized to implement the embodiments of the present disclosure.

Some example embodiments will be described in more detail with reference to the accompanying drawings, in which the example embodiments of the present disclosure have been illustrated. However, the present disclosure can be implemented in various manners, and thus should not be construed to be limited to the embodiments disclosed herein. Rather, the illustrated embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that e linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
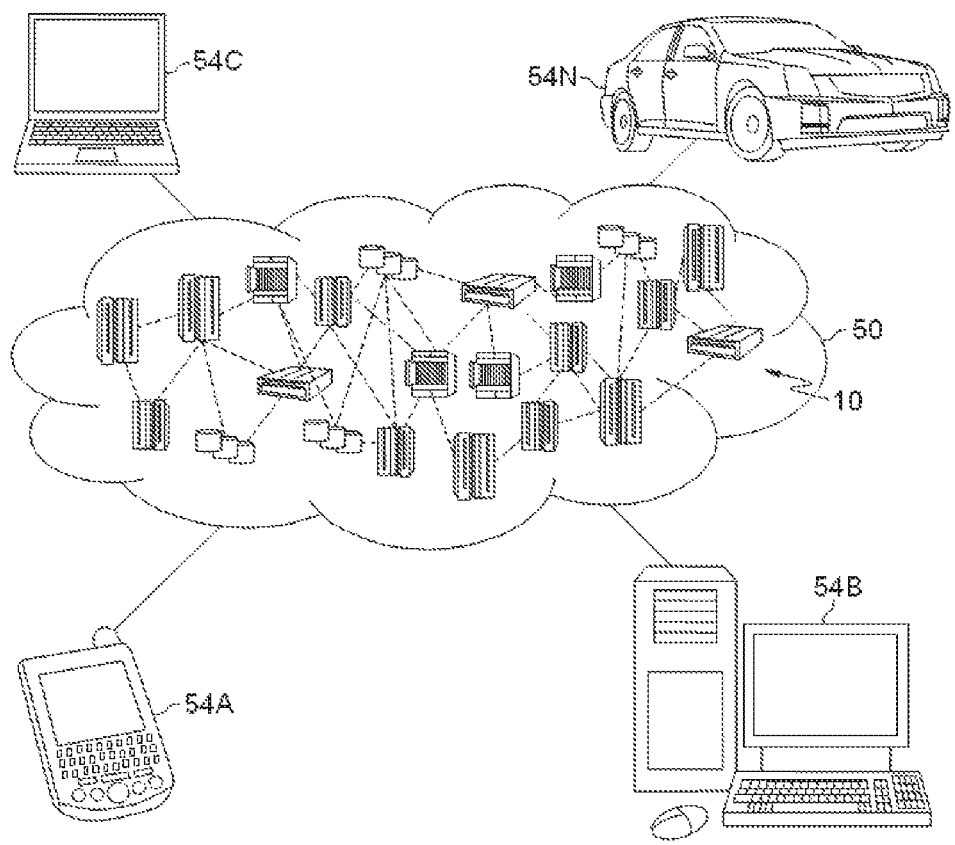
FIG. 2 schematically depicts a cloud computing environment according to an example embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
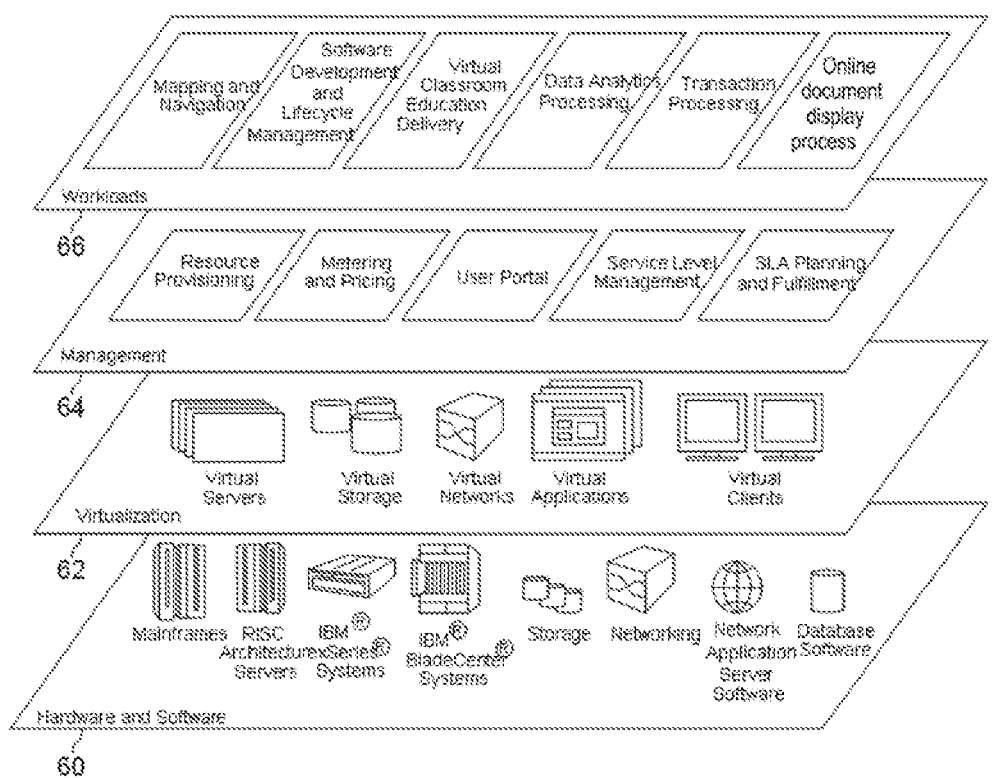
FIG. 3 schematically depicts a set of functional abstraction layers provided by cloud computing environment, such as shown in the example of FIG. 2.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and online document displaying.

In one embodiment of the present disclosure, a solution for online displaying documents according to various embodiments of the present disclosure may be implemented at workloads layer 66, so that in the cloud computing environment tools for online displaying documents may be provided to the user whereby the user can conveniently view and edit documents by way of a browser, for example, in a situation in which no document editor is installed in the user's local computer. The application environment of the present disclosure has been illustrated above; those skilled in the art should understand the embodiments of the present disclosure may be implemented under any other type of computing environment that is currently known or to be developed in future.

In the data displaying field, a conventional document editor (e.g., document editor installed on a computer) may directly obtain a size of each word in a to-be-displayed document by calling an application programming interface (API) of the operating system (i.e., with how many pixels the word is displayed in a page). However, unlike an implementation mode in the conventional document editor, in online displaying a document in a browser no API may exist and/or be available via which the size of each word in the to-be-displayed document can be obtained directly. In some such situations, the size can only be obtained by means of a document object model.

In some solutions for online displaying documents in a browser, since the browser renders page content based on the document object model, the size of the document's each word in the displaying page may be obtained and then displayed.

To obtain size of each word, the size of each word may be calculated based on the document object model one word after another in an order of words in the document. A storage space may be arranged to cache calculated sizes, so that size of a word may not need to be re-calculated when the same word is rendered once again. However, this displaying mode may provide a relatively low-efficiency and might lead to displaying delay, which may be more conspicuous for portable computing devices with limited hardware resources.

The present disclosure may provide solutions for online displaying documents that may provide improved efficiency and/or improved user experience. Consistent with embodiments of the present disclosure, the length of each word in a document may be obtained by a pre-processing step before a rendering step, so in the rendering step a corresponding word may be rendered directly based on the obtained length in the pre-processing step, rather than the size of the word being obtained based on the document object model each time before rendering.

Figure 4:
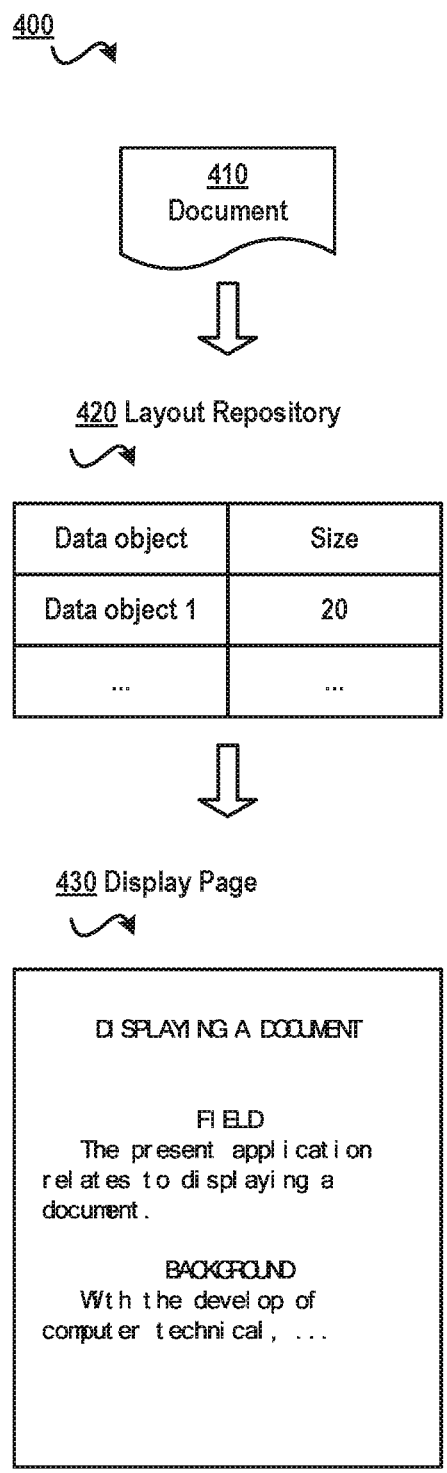
FIG. 4 schematically depicts an example architecture diagram of a technical solution for online displaying a document according to one embodiment of the present disclosure.

For example, FIG. 4 schematically shows an architecture diagram 400 of an implementation for online displaying a document according to one embodiment of the present disclosure. As shown in FIG. 4, a document 410 represents a to-be-displayed document, and each data object and size thereof may be extracted from document 410 and the corresponding size may be stored in a layout repository 420. Subsequently, the document may be displayed online based on data in layout repository 420 (as shown by a display page 430).

Note throughout the context of the present disclosure, data objects may refer to text objects in a document. For example, headings, text, words, punctuations, etc. in the document can be called text objects. For other type of data object appearing in the document, this object's size may be obtained using other approaches. For example, an image object that has a fixed size (e.g., resolution) can be displayed with the fixed size. Table objects may be divided into fixed-size tables and variable-size tables. For a fixed-size table, the table may be displayed directly with the fixed size.

For a variable-size table, however, the table's variable size may depend on size of a text object in the table. So, first size of the text object may be determined and then size of the table object may be determined, based on the method as disclosed by the present disclosure. In addition, spaces, punctuations and other special characters may fall within the meaning of text objects in the present disclosure and thus can be displayed using the method of the present disclosure.

In one embodiment of the present disclosure, there is provided a method for online displaying a document, including extracting a plurality of data objects from the document. The method may also include obtaining sizes of corresponding data objects among the plurality of data objects by constructing a document object model associated with the plurality of data objects. The method may also include generating a layout repository based on the sizes. The method may further include rendering the plurality of data objects based on the layout repository, so as to provide an online display the document.

Figure 5:
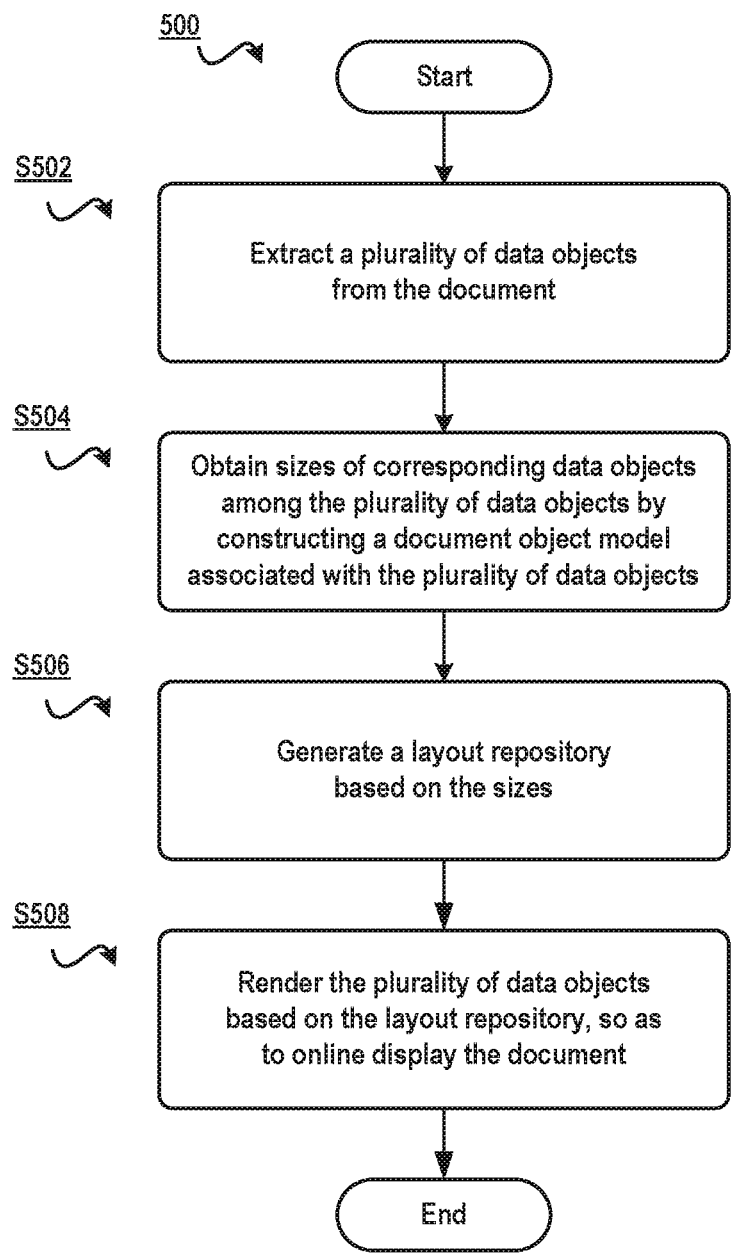
FIG. 5 schematically depicts a flowchart of a method for online displaying a document according to one embodiment of the present disclosure.

FIG. 5 schematically shows a flowchart 500 of a method for online displaying a document according to one embodiment of the present disclosure. In step S502, a plurality of data objects may be extracted from the document. Those skilled in the art will appreciate that a plurality of data objects may be extracted from a document based on various methods known in the prior art. In the context of the present disclosure, data objects may include words or symbols in a document. Suppose a document includes "Hello World!", that document may be considered to include 4 objects, which are "Hello", "space", "World" and "!".

For documents written in different languages, data objects may have different meanings. For example, in a document written in Chinese, it may be considered each Chinese character may be a data object; in a document written in English or French, it may be considered each word may be an object, etc. Since a browser supports a multilingual function, the technical solution of the present disclosure may also support online displaying a document in a multilingual environment.

Next in step S504, sizes of corresponding data objects among the plurality of data objects may be obtained by constructing a document object model associated with the plurality of data objects. It should be noted that, since content displayed in the browser is implemented via a document object model, first a document object model associated with to-be-displayed content may be constructed, and then it can be learned, based on the model, with how many pixels a corresponding data object will be displayed in the browser. In the context of the present disclosure, size of a data object refers to the data object's size when being displayed online, i.e., number of pixels occupied by the data object in one row.

Optionally, before constructing the document object model, first the plurality of data objects being extracted may be filtered. By filtering duplicated data objects, the number of data objects may be reduced and the processing efficiency may be increased. Note for English, differentiation may be made between lower case letters and upper case letters in words, and only where lower case letters and upper case letters in two words are exactly the same as each other, the two words may be regarded as duplicated data objects. For example, "Hello" and "hello" may be regarded as different data objects.

In step S506, a layout repository may be generated based on the sizes. In this step, sizes of various data objects in the document may be saved. Regarding "Hello World!", for example, a layout repository may be stored using a data structure as shown in Table 1 below.

TABLE 1

Example 1 of Layout Repository

| No. | Data Object | Length |
|---|---|---|
| 1 | Hello | 20 |
| 2 | space | 5 |
| 3 | World | 25 |
| 4 | ! | 5 |

In step S508, the plurality of data objects may be rendered based on the layout repository, so as to online display the document. In this embodiment, each data object may be displayed sequentially based on the lengths as recorded in Table 1 above. At this point, content "Hello World!" will be displayed in a page, and the content occupies 20+5+25+5=55 pixels.

In one embodiment of the present disclosure, a data object among the plurality of data objects may be uniquely identified based on text content and style associated with the data object. The foregoing example shows a case where various data objects may be differentiated based on only text content of these data objects. Since a data object's size may depend on not only its text content but also its style, data objects may be uniquely identified based on these data objects' text content and style.

In this embodiment, a data object may be represented as a two-tuple (text content, style). In this manner, (Hello, bold) and (Hello, italics) represent different data objects. In the context of the present disclosure, the style may include at least any one of: font, font size, bold, italics, superscript, subscript, heading, and text. Therefore, when the style comprises a plurality of items, the two-tuple may be extended as a multi-tuple. For example, (Hello, bold, 8 size) may represent that Hello is displayed in 8-size font and in bold. Where both text content and style of a data object are taken into consideration, a layout repository may be stored using a data structure as shown in Table 2 below.

TABLE 2

Example 2 of Layout Repository

| No. | Data Object | Length |
|---|---|---|
| 1 | Hello, 8 size | 20 |
| 2 | Hello, 8 size, bold | 25 |
| 3 | Hello, 8 size, italics | 26 |
| ... | ... | ... |

To further increase the data processing efficiency, data objects in the document may be grouped according to their style, and subsequently with respect to various data objects in each group among a plurality of resulting groups, sizes of various data objects may be obtained in the above-described manner.

In one embodiment of the present disclosure, obtaining sizes of corresponding data objects among the plurality of data objects by constructing a document object model associated with the plurality of data objects may include dividing the plurality of data objects into a plurality of groups based on style associated with data objects among the plurality of data objects. With respect to each group, a document object model may be constructed associated with at least one data object in the group based on text content and style associated with the at least one data object in the group, thereby constructing the document object model associated with the plurality of data objects. Further a browser may be used to render the document object model, so as to obtain sizes of corresponding data objects among the plurality of data objects.

Note the style may include an inline style. For example, after applying "heading" style to a paragraph, all contents in the paragraph may be in bold type, but still partial contents in the paragraph may be set as italics, and removing the bold attribute. Therefore, before calculating size of an object, final style of the object may be obtained, which may be calculated through style hierarchical relationship and priority arrangement. The calculation process may only consider style that affects size of a data object (such as font, font size, bold, italics, superscript, subscript, heading, and text), but may ignore irrelevant style (such as underline, strikethrough, font color, background color, etc.). Suppose a document's contents read "Hello word1 word2 world", style of data objects in the document may be represented in a manner below:

```
<Style>
  <S1> font-size: 10pt;</S1>
  <S2>
  parent-style: S1;
  bold: true;
  </S2>
</Style>
<p style="S2"> Hello word1 word2 <font-size:20pt;>world</font-size>
</P>
```

Concerning this example, style of "Hello" is as defined by S2, wherein S2 inherits style of S1. In displaying "world," the style of S2 is overwritten by using custom font size "20." According to the above method for grouping based on style, "Hello", "word1" and "word2" may be grouped into a first group, while "world" may be grouped to a second group. At this point, style of "Hello," "word1" and "word2" is "font-size: 10 pt; bold: true."

In one embodiment of the present disclosure, obtaining sizes of corresponding data objects among the plurality of data objects by constructing a document object model associated with the plurality of data objects may include constructing the document object model based on text content and style associated with the plurality of data objects. Further, a browser may be used to render the document object model so as to obtain sizes of corresponding data objects among the plurality of data objects.

In this embodiment, text content and style of "Hello," "word1," "word2" and "world" obtained using the above method may be used to construct a document object model associated with these data objects. For example, since data objects have been divided into a plurality of groups according to style of the data objects, corresponding processing may be performed with respect to various data objects in each group. Specifically, with respect to data objects "Hello," "word1" and "word2" in the first group, a document object model may be constructed using a method below.

```
var words = ["hello", "word1", "word2"];  //data objects having the same style
var style = "font-size:10pt;bold:true";   //style
var domStr = "";                           //string for saving DOM
for (var i = 0; i<words.length; i++)
```

-continued

```
{
domStr += "<div style=" + style + ">" + words[i] + "</div>";
//create one DOM node for each word
}
var existDOMNode.innerHtml = domStr;
//replace existing node with string domStr, browser will automatically
generate DOM node
```

It should be noted that the above is only intended to provide an example concrete implementation of how to construct a document object model. This example is only for illustration rather than limiting, and those skilled in the art will appreciate that other implementations may be equally utilized. In addition, although illustrated above is a method for constructing a document object model with respect to data objects in a first group only, those skilled in the art will recognized that processing may be performed with respect to data objects in a second group in a similar manner and based on the principle being illustrated.

Dividing the plurality of data objects into groups according to style may serve the purpose of increasing the data processing efficiency; however, this step is not essential but an optional step that may allow for further increasing efficiency. Those skilled in the art will understand that the plurality of data objects extracted from the document may be directly processed, e.g., without grouping these data objects.

Since the pixel number for displaying a data object in the browser is associated with a document object model, where a document object model has been obtained, the document object model may be rendered using the browser, so as to obtain the size of a corresponding data object. Specifically, in one embodiment of the present disclosure, using a browser to render the document object model so as to obtain sizes of corresponding data objects among the plurality of data objects may further include using an application programming interface of the browser to obtain sizes of corresponding data objects among the plurality of data objects.

Sizes of various data objects may be obtained using an application programming interface of the browser. For example, an approach below may be used in some implementations:

```
var sizes = new Array;
for (var i = 0; i< words.length; i++)
{
  sizes[i] = existDOMNode.getChild (i) .size;
  // using browser API to obtain size of each object
}
```

As corresponding nodes of the document object model may have been created with respect to each data object, at this point only by calling the browser's application programming interface to obtain size of each node, can the pixel number occupied by each data node displayed in the browser be obtained. In this example, size of each data object may be obtained using existDOMNode.getChild (i) .size. Similarly, those skilled in the art will understand that data objects in other group may be processed in a similar manner, e.g., based on the principle of this example.

In one embodiment of the present disclosure, rendering the plurality of data objects based on the layout repository so as to online display the document may include rendering the plurality of data objects line by line according to page width for online displaying the document and based on the layout repository, so as to online display the document.

Since page width for online displaying the document can be obtained and sizes of data objects in the document have been stored in the previous pre-processing step, various data objects in the document may be sequentially placed in each line, so as to online display the document. When free space in one is not sufficient to accommodate a next data object in the document (i.e., remaining pixels are less than size of the next data object), a new line may be created and the next data object may be placed at the first position of the new line.

Figure 6A:
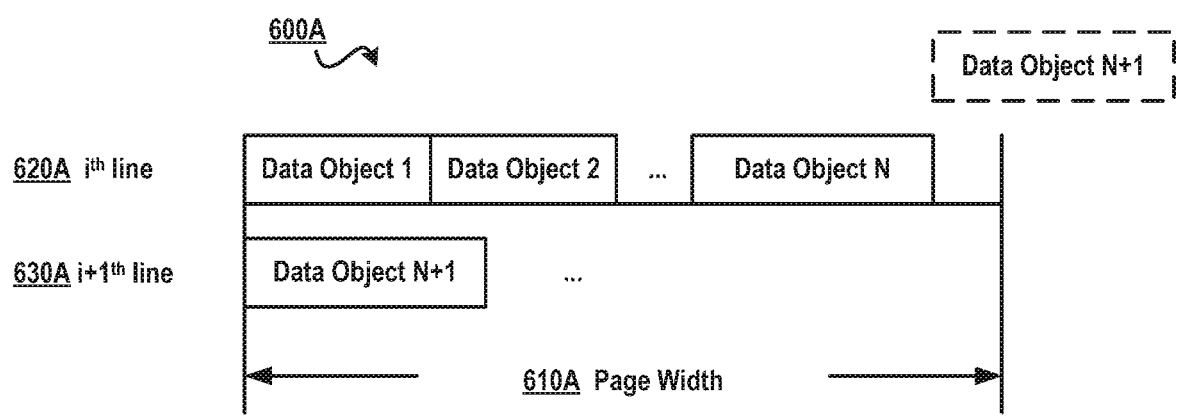
FIGS. 6A to 6B schematically depict schematic views of placing data objects in a page according to one embodiment of the present disclosure, respectively.
Figure 6B:
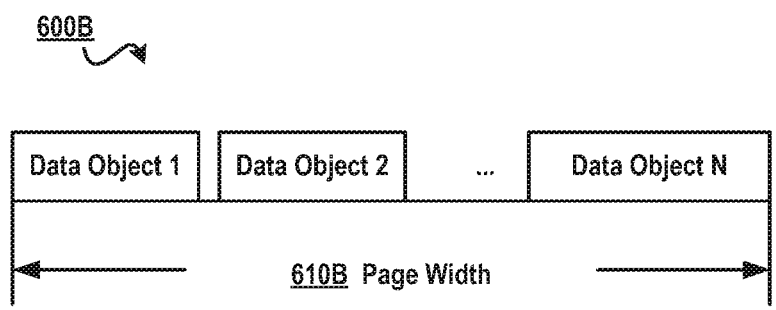

FIGS. 6A to 6B illustrate schematic views 600A-600B of placing data objects in a page according to one embodiment of the present disclosure. FIG. 6A shows a schematic view of placing a plurality of data objects in a document at one line one after another. Page width is shown by reference numeral 610A; as shown by 620A in the $i^{th}$ line, data objects 1 to N are sequentially placed in the $i^{th}$ line, and after placing a data object N, free space in the $i^{th}$ line is not sufficient to accommodate a data object N+1, so a new line (630A in the $i+1^{th}$ is created. Next, data object N+1 may be placed at the starting position of the $i+1^{th}$ line. In this manner, each data object in the document may be processed in order.

Note since "space" also belongs to text data, the processing performed to "space" may follow the method of the present disclosure without special processing. In addition, when there is a data object representing "enter", a new paragraph may be created, and data objects after "enter" may be placed in a new line.

It should be noted that, since the document layout further relates to "align mode", when displaying the document in the browser, impact of "align mode" on display effect of the document may further be considered. Conventional align modes may include: left, right, center and justify.

In one embodiment of the present disclosure, with respect to at least one data object in a line of the document being displayed online, a difference between the page width and size of the at least one data object may be calculated. The at least one data object may be placed within the line according to the difference and an align mode of the document. In left alignment, the difference between the page width and the plurality of data objects (i.e., space) may be placed at the right of a line, so as to achieve left-align (as shown in FIG. 6A). As how to achieve left-align, it has been described with reference to the example in FIG. 6A, and those skilled in the art will appreciate that right-align and center-align may be accomplished based on the principle being illustrated and described with respect to left-align.

In one embodiment of the present disclosure, placing the at least one data object within the line according to the difference and an align mode of the document may include dividing the difference so as to evenly place the at least one data object within the line. FIG. 6B schematically shows a block diagram of justify-align. In this example, the difference may be evenly distributed between various data objects so as to achieve justify-align. For example, suppose the page width is 800, the size of each data object is 80, and 9 data objects may be displayed in one line (suppose size of the $10^{th}$ data object is greater than 80). At this point a difference between the page width and sizes of all data objects is 800−80×90=80, i.e., 80 pixels are left after placing these 9 data objects in one line one after another. At this point, 80 pixels may be equally allocated to positions between each of the 9 data objects, whereby 9 data objects are displayed in one line in justify-align mode. At this point, a first data object may be displayed at a position of the 1-80 pixels, space is displayed at a position of the 81-90 pixels, a second data object is displayed at a position of the 91-170 pixels, and so on and so forth.

Figure 7:
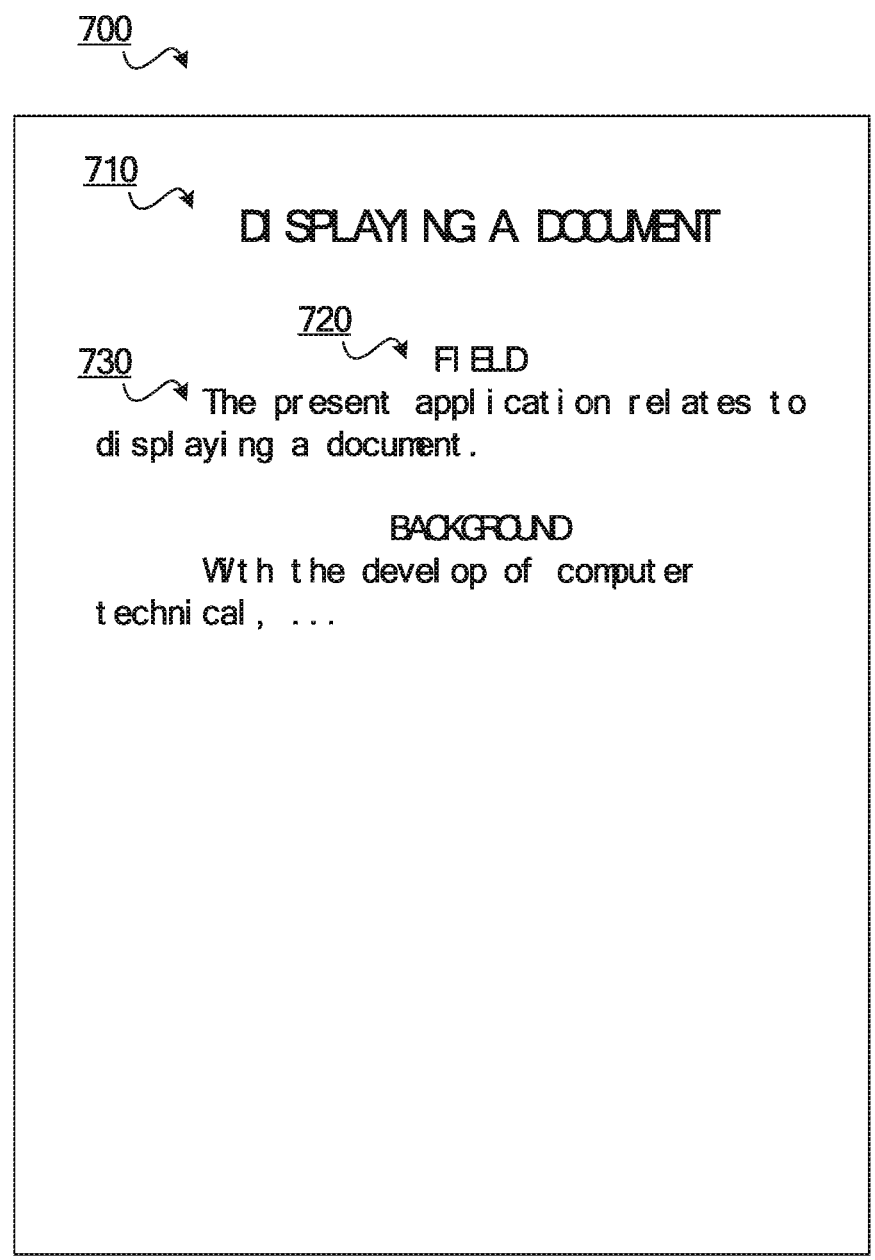
FIG. 7 schematically depicts a schematic view of a page of an online displayed document according to one embodiment of the present disclosure.

FIG. 7 illustrates a schematic view 700 of a page of an online displayed document according to one embodiment of the present disclosure. According to the method described above, a document may be displayed in the online text editor via the browser. As shown in FIG. 7, a first-level heading of the document is shown in 710, which is centered in font size 18; a second-level heading of the document is shown in 720, which is centered in font size 14; text of the document is shown in 730, which is left-aligned in font size 14.

Using the embodiments described above, by executing the pre-processing step before the rendering step, sizes of various data objects in the document can be obtained fast and efficiently, and corresponding sizes may be stored in the layout repository. In the subsequent rendering step, therefore, size of each data object in the document can be obtained rapidly and efficient drawing (e.g., rendering) achieved. In addition, the data processing efficiency may further be increased by dividing a plurality of data objects into a plurality of groups based on style of these data objects and processing with respect to data objects in each group.

The various embodiments implementing the method of the present disclosure have been described above with reference to the accompanying drawings. Those skilled in the art may understand that the method may be implemented in software, hardware or a combination of software and hardware. Moreover, those skilled in the art may understand by implementing various steps in the above method in software, hardware or a combination of software and hardware, there may be provided an apparatus based on the same concept. Even if the apparatus has the same hardware structure as a general-purpose processing device, the functionality of software contained therein may render the apparatus manifest distinguishing properties from the general-purpose processing device, thereby forming an apparatus of the various embodiments of the present disclosure. The apparatus described in the present disclosure may include several means or modules, the means or modules configured to execute corresponding steps. Upon reading this specification, those skilled in the art may understand how to write a program for implementing actions performed by these means or modules. Since the apparatus is based on the same disclosure concept as the method, the same or corresponding implementation details are also applicable to means or modules corresponding to the method. As detailed and complete description has been presented above, the apparatus is not detailed below.

Figure 8:
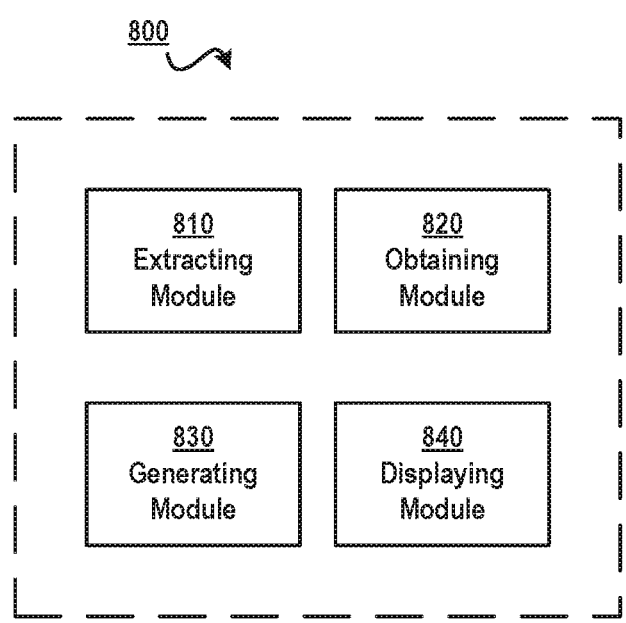
FIG. 8 schematically depicts a block diagram of an apparatus for online displaying a document according to one embodiment of the present disclosure.

FIG. 8 schematically shows a block diagram 800 of an apparatus for online displaying a document according to one embodiment of the present disclosure. There is provided an apparatus for online displaying a document, including: an extracting module 810 configured to extract a plurality of data objects from the document; an obtaining module 820 configured to obtain sizes of corresponding data objects among the plurality of data objects by constructing a document object model associated with the plurality of data objects; a generating module 830 configured to generate a layout repository based on the sizes; and a displaying module 840 configured to render the plurality of data objects based on the layout repository, so as to online display the document.

In one embodiment of the present disclosure, a data object among the plurality of data objects is uniquely identified based on text content and style associated with the data object.

In one embodiment of the present disclosure, obtaining module 820 may include: a constructing module configured to construct the document object model based on text content and style associated with the plurality of data objects; and a size obtaining module configured to use a browser to render the document object model so as to obtain sizes of corresponding data objects among the plurality of data objects.

In one embodiment of the present disclosure, obtaining module 820 may include: a grouping module configured to divide the plurality of data objects into a plurality of groups based on style associated with data objects among the plurality of data objects; a first constructing module configured to, with respect to each group, construct a document object model associated with at least one data object in the group based on text content and style associated with the at least one data object in the group, thereby constructing the document object model associated with the plurality of data objects; and a first size obtaining module configured to use a browser to render the document object model, so as to obtain sizes of corresponding data objects among the plurality of data objects.

In one embodiment of the present disclosure, the size obtaining module may further include: a calling module configured to use an application programming interface of the browser to obtain sizes of corresponding data objects among the plurality of data objects.

In one embodiment of the present disclosure, displaying module 840 may include: a line displaying module configured to render the plurality of data objects line by line according to page width for online displaying the document and based on the layout repository, so as to online display the document.

In one embodiment of the present disclosure, the line displaying module may include: a calculating module configured to, with respect to at least one data object in a line of the document being displayed online, calculate a difference between the page width and size of the at least one data object; and an aligning module configured to place the at least one data object within the line according to the difference and an align mode of the document.

In one embodiment of the present disclosure, the aligning module may include: a dividing module configured to divide the difference so as to evenly place the at least one data object within the line.

In one embodiment of the present disclosure, the style may include at least any one of: font, font size, bold, italics, superscript, subscript, heading, and text.

In one embodiment of the present disclosure, the data object is a text object.

As described above, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the uses computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   extracting, by one or more processors, a plurality of data objects from a document;
   obtaining, by the one or more processors, sizes of corresponding data objects among the plurality of data objects by constructing a document object model associated with the plurality of data objects, including excluding an irrelevant style from consideration when obtaining the sizes of the corresponding data objects, wherein the irrelevant style is a style that does not affect the size of the data object, including one or more of underlining, strikethrough font color, and background color;
   generating, by the one or more processors, a layout repository based on, at least in part, the sizes; and
   rendering, by the one or more processors, the plurality of data objects based on, at least in part, the layout repository, so as to online display the document.

2. The method according to claim 1, wherein a data object among the plurality of data objects is uniquely identified based on, at least in part, text content and style associated with the data object.

3. The method according to claim 2, wherein the obtaining sizes of corresponding data objects among the plurality of data objects by constructing a document object model associated with the plurality of data objects comprises:
   constructing the document object model based on, at least in part, text content and style associated with the plurality of data objects; and
   using a browser to render the document object model so as to obtain sizes of corresponding data objects among the plurality of data objects.

4. The method according to claim 2, wherein the obtaining sizes of corresponding data objects among the plurality of data objects by constructing a document object model associated with the plurality of data objects comprises:
   dividing the plurality of data objects into a plurality of groups based on, at least in part, style associated with data objects among the plurality of data objects;
   with respect to each group, constructing a document object model associated with at least one data object in the group based on, at least in part, text content and style associated with the at least one data object in the group, thereby constructing the document object model associated with the plurality of data objects; and
   using a browser to render the document object model, so as to obtain sizes of corresponding data objects among the plurality of data objects.

5. The method according to claim 3, wherein the using a browser to render the document object model so as to obtain sizes of corresponding data objects among the plurality of data objects further comprises:
   using an application programming interface of the browser to obtain sizes of corresponding data objects among the plurality of data objects.

6. The method according to claim 1, wherein the rendering the plurality of data objects based on, at least in part, the layout repository so as to online display the document comprises:
   rendering the plurality of data objects line by line according to page width for online displaying the document and based on, at least in part, the layout repository, so as to online display the document.

7. The method according to claim 6, wherein the rendering the plurality of data objects line by line according to page width for online displaying the document and based on, at least in part, the layout repository so as to online display the document comprises:
   with respect to at least one data object in a line of the document being displayed online, calculating a difference between the page width and size of the at least one data object; and
   placing the at least one data object within the line according to the difference and an align mode of the document.

8. The method according to claim 7, wherein the placing the at least one data object within the line according to the difference and an align mode of the document comprises:
   dividing the difference so as to evenly place the at east one data object within the line.

9. The method according to claim 1, wherein the style comprises at least any one of: font, font size, bold, italics, superscript, subscript, heading, and text.

10. The method according to claim 1, wherein the data object is a text object.

11. A computer program product comprising a non-transitory computer readably storage medium having a plurality of instructions stored thereon, which, when executed by a processor, cause the processor to perform operations comprising:
   extracting a plurality of data objects from a document;
   obtaining sizes of corresponding data objects among the plurality of data objects by constructing a document object model associated with the plurality of data objects, including excluding an irrelevant style from consideration when obtaining the sizes of the corresponding data objects, wherein the irrelevant style is a style that does not affect the size of the data object, including one or more of underlining, strikethrough, font color, and background color;
   generating a layout repository based on, at least in part, the sizes; and
   rendering the plurality of data objects based on, at least in part, the layout repository, so as to online display the document.

12. The computer program product according to claim 11, wherein a data object among the plurality of data objects is uniquely identified based on, at least in part, text content and style associated with the data object.

13. The computer program product according to claim 11, wherein the instructions for rendering the plurality of data objects based on, at least in part, the layout repository so as to online display the document comprise instructions for:
   rendering the plurality of data objects line by line according to page width for online displaying the document and based on, at least in part, the layout repository, so as to online display the document.

14. The computer program product according to claim 11, wherein the style comprises at least any one of: font, font size, bold, italics, superscript, subscript, heading, and text.

15. The computer program product according to claim 11, wherein the data object is a text object.

16. A computing system comprising:
   a processor and a memory device coupled with the processor, the processor configured for:
   extracting a plurality of data objects from a document;
   obtaining sizes of corresponding data objects among the plurality of data objects by constructing a document object model associated with the plurality of data objects, including excluding an irrelevant style from consideration when obtaining the sizes of the corresponding data objects, wherein the irrelevant style is a style that does not affect the size of the data object, including one or more of underlining, strikethrough, font color, and background color;
   generating a layout repository based on, at least in part, the sizes; and
   rendering the plurality of data objects based on, at least in part, the layout repository, so as to online display the document.

17. The computing system according to claim 16, wherein a data object among the plurality of data objects is uniquely identified based on, at least in part, text content and style associated with the data object.

18. The computing system according to claim 16, wherein the processor configured for rendering the plurality of data objects based on, at least in part, the layout repository so as to online display the document is further configured for:
   rendering the plurality of data objects line by line according to page width for online displaying the document and based on, at least in part, the layout repository, so as to online display the document.

19. The computing system according to claim 16, wherein the style comprises at least any one of: font, font size, bold, italics, superscript, subscript, heading, and text.

20. The computing system according to claim 16, wherein the data object is a text object.

* * * * *